US007387424B2

(12) United States Patent
Koegler, III et al.

(10) Patent No.: US 7,387,424 B2
(45) Date of Patent: Jun. 17, 2008

(54) REPLACEABLE LAMP HEADER FOR POSITIONING A LAMP WITHIN A REFLECTOR ASSEMBLY (75) Inventors: John M. Koegler, III, Corvallis, OR (US); Timothy F. Myers, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 10/769,613

(22) Filed: Jan. 30, 2004

(65) Prior Publication Data
US 2005/0169014 A1 Aug. 4, 2005

(51) Int. Cl.
*H01R 33/20* (2006.01)
*H01K 1/16* (2006.01)
*F21V 7/00* (2006.01)

(52) U.S. Cl. .............. 362/647; 362/649; 362/652; 362/296; 439/613; 313/318.12

(58) Field of Classification Search ............... 362/649, 362/652, 640, 647, 650; 439/613; 313/318.12
See application file for complete search history.

(56) References Cited

U.S. PATENT DOCUMENTS

| 591,490 | A | * | 10/1897 | Palm .......................... 362/640 |
| 3,348,094 | A | | 10/1967 | Smith |
| 4,201,438 | A | * | 5/1980 | Shea ........................... 439/611 |
| 4,384,319 | A | * | 5/1983 | Blaisdell et al. ............ 362/296 |
| 4,389,700 | A | | 6/1983 | Blaisdell et al. |
| 4,950,942 | A | * | 8/1990 | Braun et al. ........... 313/318.07 |
| 5,216,318 | A | * | 6/1993 | Van Dulmen et al. ...... 362/652 |
| 5,239,226 | A | * | 8/1993 | Seredich et al. ............ 362/652 |
| 5,510,967 | A | * | 4/1996 | Coushaine et al. ......... 362/287 |
| 5,860,720 | A | | 1/1999 | Negishi et al. |
| 6,039,579 | A | * | 3/2000 | Paul et al. .................... 439/56 |
| 6,082,864 | A | | 7/2000 | Rodriguez et al. |
| 6,210,020 | B1 | * | 4/2001 | Van Dulmen et al. ...... 362/655 |
| 6,268,799 | B1 | | 7/2001 | Miyashita et al. |
| 6,333,602 | B1 | | 12/2001 | Kayser |
| 6,362,573 | B1 | | 3/2002 | Helbing et al. |
| 2002/0113560 | A1 | | 8/2002 | Edwards et al. |

FOREIGN PATENT DOCUMENTS

| GB | 256024 | 8/1926 |
| GB | 643861 | 9/1950 |
| GB | 861032 | 2/1961 |
| GB | 360910 | 11/1981 |
| JP | 59035353 | 2/1984 |
| JP | 62193268 | 8/1987 |
| JP | 02250235 | 10/1990 |
| JP | 09045965 | 2/1997 |

* cited by examiner

*Primary Examiner*—Ismael Negron (57) ABSTRACT

A replaceable lamp header includes a base member and an annular lamp engaging protrusion extending from a first surface of the base member, at least two positive and negative source connections disposed on lateral portions of the base member, a positive and a negative lamp connection coupled to the annular lamp engaging protrusion, and electrical interconnects coupling each of the positive source connections to the positive lamp connection and coupling each of the negative source connections to the negative lamp connection.

17 Claims, 7 Drawing Sheets

Fig. 6

REPLACEABLE LAMP HEADER FOR POSITIONING A LAMP WITHIN A REFLECTOR ASSEMBLY

BACKGROUND

Digital projectors, such as digital mirror devices (DMD) and liquid crystal display (LCD) projectors, project high quality images onto a viewing surface. Both DMD and LCD projectors utilize high intensity lamps and reflectors to generate the light needed for projection. Light generated by the lamp is concentrated as a 'fireball' that is located at a focal point of a reflector. Light produced by the fireball is directed into a projection assembly that produces images and utilizes the generated light to form the image. The image is then projected onto a viewing surface. Misalignment of the focal point causes degradation of the image since less light is captured and creates 'hot spots' on the screen instead of a uniform brightness.

Efforts have been directed at making projectors more compact while making the image of higher and higher quality. As a result, the lamps utilized have become more compact and of higher intensity. Higher intensity lamps produce high, even extreme heat. The outer surface of the lamps can approach temperatures of 900° C. As a result, projector designs must account for the intense heat. In addition, losses due to misalignment of the fireball with respect to the reflector are amplified in systems utilizing high intensity lamps.

Some designs attempt to account for the heat by permanently placing the lamp within the reflector. The use of a high temperature epoxy holds the lamp relative to the reflector. Flexible electrodes from the lamp then placed through two holes in the reflector and are soldered to a metal connection. However, the two holes in the reflector allow light to escape, thereby degrading the image. The other end of the metal connection allows wires to be attached from an electrical source. When the lamp has surpassed its useful life, the costly reflector and lamp assembly, which can be referred to as the light generation assembly, is simply replaced and the old assembly is discarded. No process operating information, such as the actual life of the lamp, is available to designers.

SUMMARY

A replaceable lamp header for positioning a lamp within a light generation assembly includes a base member and an annular lamp engaging protrusion extending from a first surface of the base member, at least two positive and negative source connections disposed on lateral portions of the base member, a positive and a negative lamp connection coupled to the annular lamp engaging protrusion, and electrical interconnects coupling each of the positive source connections to the positive lamp connection and coupling each of the negative source connections to the negative lamp connection.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A replaceable lamp header for orientably positioning a lamp within a light generation assembly includes a base member and an annular lamp engaging protrusion extending from a first surface of the base member, at least two positive and negative source connections disposed on lateral portions of the base member, a positive and a negative lamp connection coupled to the annular lamp engaging protrusion; and electrical interconnects coupling each of the positive source connections to the positive lamp connection and coupling each of the negative source connections to the negative lamp connection.

The present system and method allows the replacement of only a lamp when the lamp has surpassed its useful life without requiring the replacement of an entire light generating assembly of a projector. In addition, the exemplary embodiments allow the removal and replacement of the lamp without the use of tools while providing the ability to monitor several useful engineering parameters and provide seamless upgrades to a projector system's firmware. Further, the configuration of an improved lamp assembly according to one exemplary embodiment facilitates the optimal positioning of a fireball generated by a lamp with respect to a reflector assembly whether the projector system is mounted on a table or from a ceiling.

As defined herein and in the appended claims, firmware shall be broadly understood to mean any instructions or data that affects the operation of a projector system or its components. Further, fireball shall be broadly understood to mean light produced by a lamp at or near the source or origin of the light. Green layer shall be broadly understood to mean uncured ceramic material, regardless of whether the ceramic material specifically contains organic material.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1A:
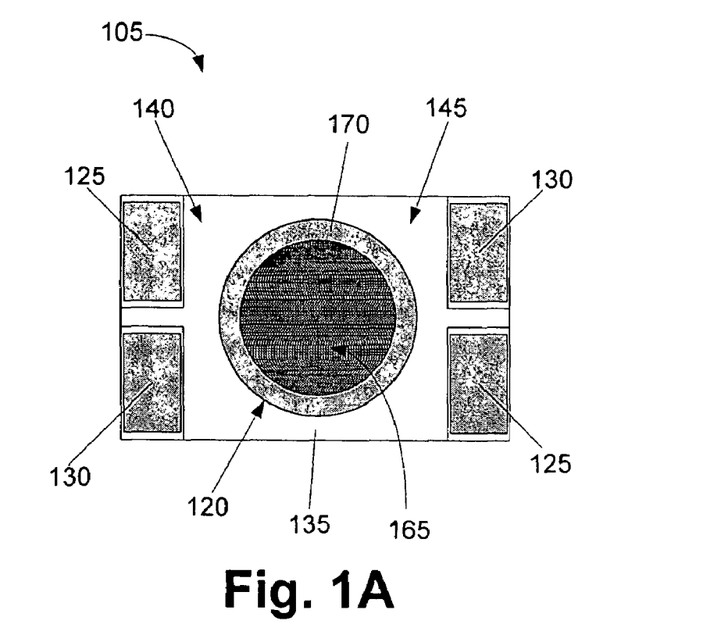
FIG. 1A illustrates a top view of the header according to one exemplary embodiment.
Figure 1B:
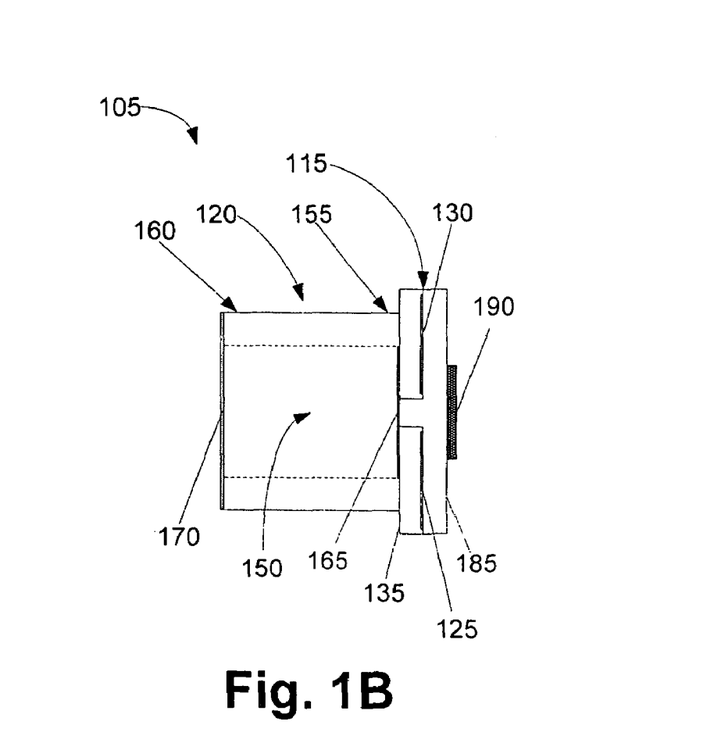
FIG. 1B illustrates a side view of the header shown in FIG. 1A.
Figure 1C:
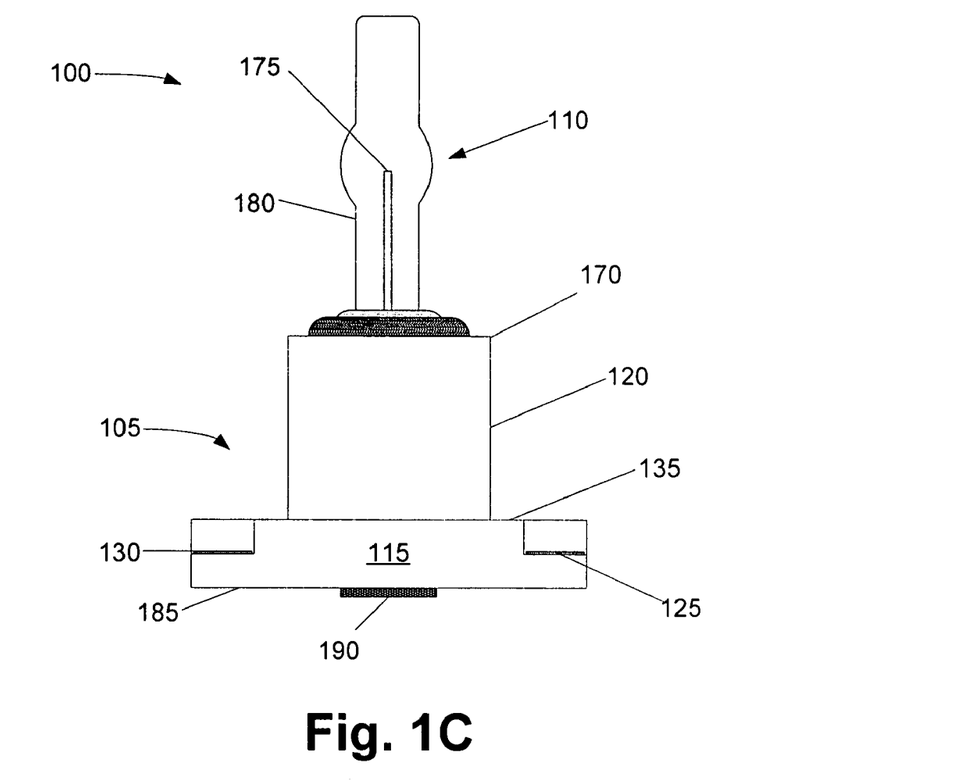
FIG. 1C illustrates a side view of the improved lamp assembly shown in FIG. 1A.

FIGS. 1A-1D illustrate an improved lamp assembly (100) which includes a header (105), as shown in FIG. 1A-1B, and a lamp (110) coupled thereto, as shown in FIG. 1C. The header (105) includes a base member (115), and a lamp engaging member (120) extending away from the base member (115).

The base member (115) includes first source connections (125) and second source connections (130) formed on a front surface (135) of the base member (115). The first source connections (125) are located in opposing corners of first and second lateral portions (140, 145) of the front surface (135). The second source connections (130) are located in the other opposing corners of the first and second lateral portions (140, 145). As a result, each of the lateral portions (140, 145) have a first source connection (125) and a second source connection (130). The source connections are of opposite polarity, such that one is a positive source connection and the other is a negative source connection.

The lamp engaging member (120) extends away from the front surface (135) of the base member (115) and includes a lamp receiving cavity (150) formed between first and second ends (155, 160) of the lamp engaging member (120). A first lamp connection (165) is formed on the front surface (135) of the base member (115) near the first end (155) of the lamp engaging member (120). In addition, a second lamp connection (170) is formed around the lamp receiving cavity (150) or on the lip of the second end (160) of the lamp engaging member (120).

Electrical interconnects are formed within the header and electrically couple the source connections (125, 130) on each lateral portion (140, 145) of the base member (115) to the lamp connections (165, 170).

The lamp (110) includes a fireball generator (175) within a tube (180). The lamp also includes power connections, not shown, coupled to the lamp connections. The fireball generator (175) includes electrodes located inside the lamp (110) that create a fireball, or plasma, in response to an electrical current. The electrical current is supplied to the fireball generator (175) when the lamp's power connections are electrically coupled to first and second lamp connections (165, 170), which are in turn electrically coupled to a first and a second source connections (125, 130), which are in turn coupled to a power source. The lamp (110) is secured to the header (105) by the use of heat-resistant ceramic adhesive.

Figure 1D:
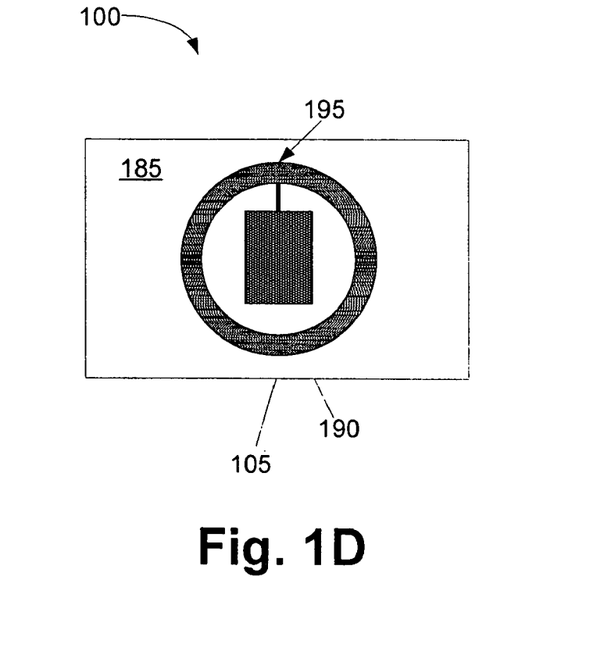
FIG. 1D illustrates a bottom view of the header according to FIG. 1A
Figure 4:
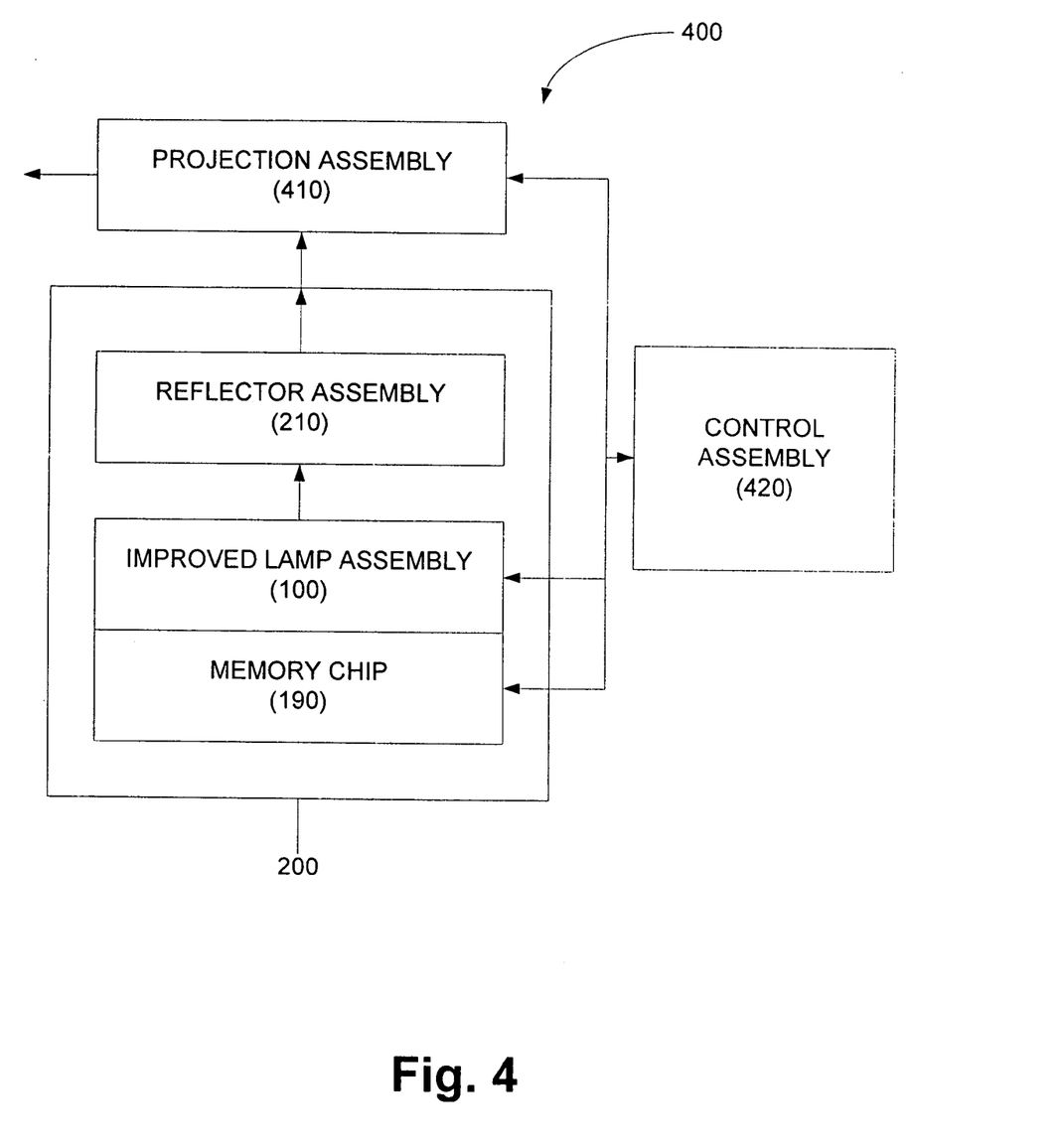
FIG. 4 is a schematic diagram of a projector system according to one exemplary embodiment.

FIGS. 1B-1D also illustrate a second surface (185) of the base member (115). An active device such as a memory chip (190) is coupled to the second surface (185) of the base member (115). The memory chip (190) is coupled to contact pads (195) that are in communication with a control assembly (420; FIG. 4) as discussed below. The contact pads (195) are configured to facilitate communication with the control assembly (420; FIG. 4) regardless of the mounting configuration of the improved lamp assembly (100). Alternatively, the memory chip (190) may have an electromagnetic interface such as a magnetic or optical interface to provide for contactless coupling. The significance of this interaction will be discussed in more detail below with reference to FIG. 4.

Figure 2:
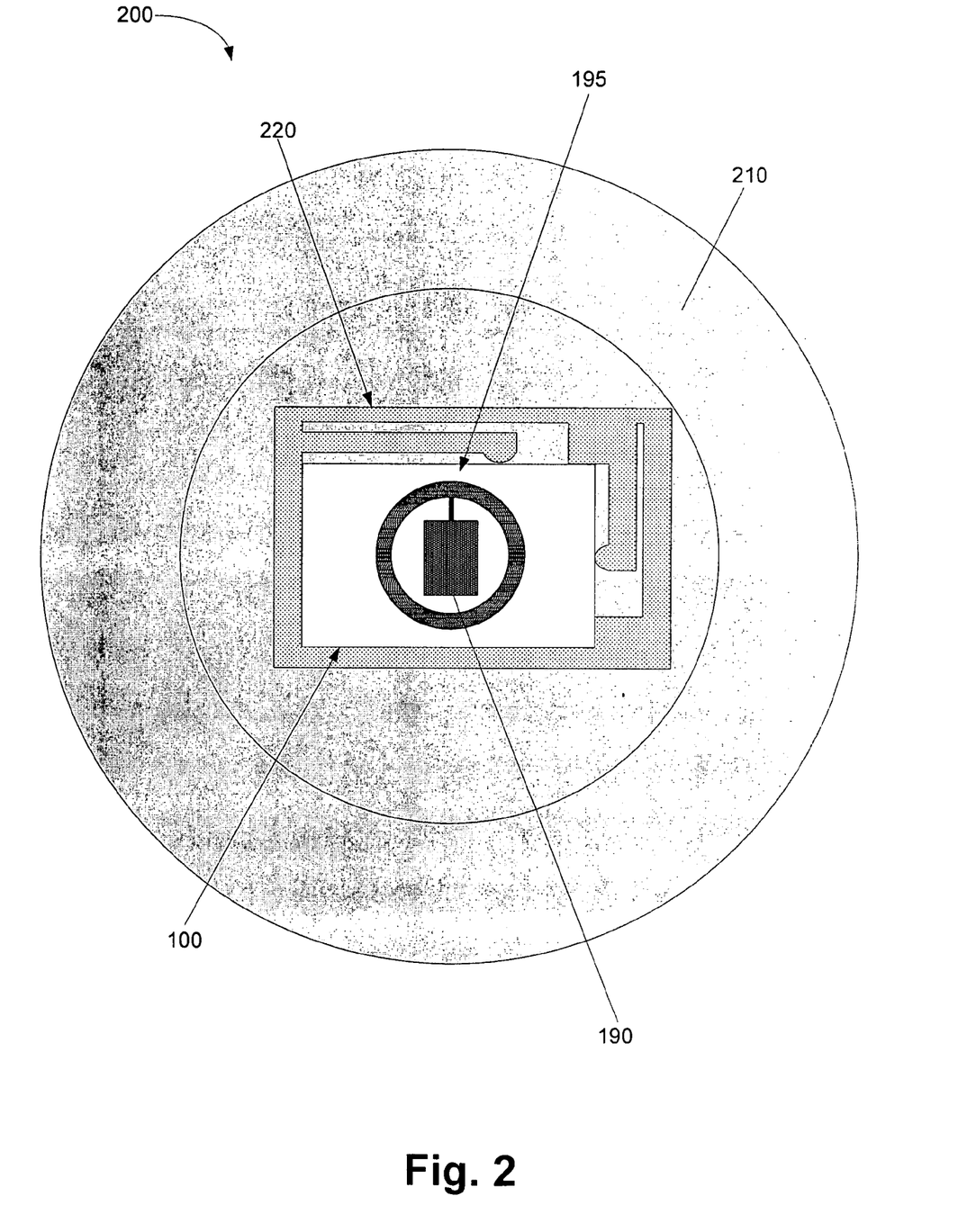
FIG. 2 illustrates a rear view of a light generation assembly according to one exemplary embodiment.

FIG. 2 illustrates a light generation assembly (200) that includes an improved lamp assembly (100) and a reflector assembly (210). The light generation assembly (200) further includes a latching assembly (220). The latching assembly (220) facilitates the rapid coupling and removal of the improved lamp assembly (100) to the light generation assembly such that the improved lamp assembly (100) may be replaced without replacing the entire light generation assembly (200). As a result, the improved lamp assembly significantly reduces the operating costs of projection systems. In addition, the configuration of the source connections (125, 130; FIGS. 1A-1C) and the lateral portions (140, 145; FIG. 1A) facilitate the optimal positioning of the improved lamp assembly (100) with respect to the mounting configuration of the projector system of which the light generation assembly (200) is a part.

The lamp (110) is aligned with respect to the reflector assembly (210) such that the fireball generator (175) is placed in an optimal position within the reflector assembly (210). The present apparatus provides for the maintenance of this optimal position, regardless of the mounting configuration of the reflector assembly (210).

One example of a mounting configuration is a projector system mounted on a table. In this configuration, the reflector assembly is in a first orientation. As previously discussed, the heat generated by the lamp (110) is extreme and is cooled by convection. As a result of the heat created by the fireball, the fireball generator (175; FIG. 1) tends to elevate slightly when in a horizontal position as in when the system is placed on a table top or other flat surface. As a result, when the fireball generator (175, FIG. 1) elevates due to the heat, it elevates to its optimal position with respect to the reflector assembly (210). When the projector system is inverted, as would be the case when the projector system is mounted to an overhead support such as a ceiling, the reflector assembly (210) is inverted from the first orientation to a second orientation. As a result, it would be necessary to rotate the improved lamp assembly 180 degrees with respect to the reflector assembly to a second orientation. Such rotation is possible because source connections (125, 130; FIG. 1) and the contact pads (195) are disposed on both the first and second lateral portions (140, 145; FIG. 1). As a result, the lamp assembly may be rotated 180 degrees with respect to the reflector assembly while maintaining the electrical and the memory connections.

Exemplary Implementation and Operation

Figure 3:
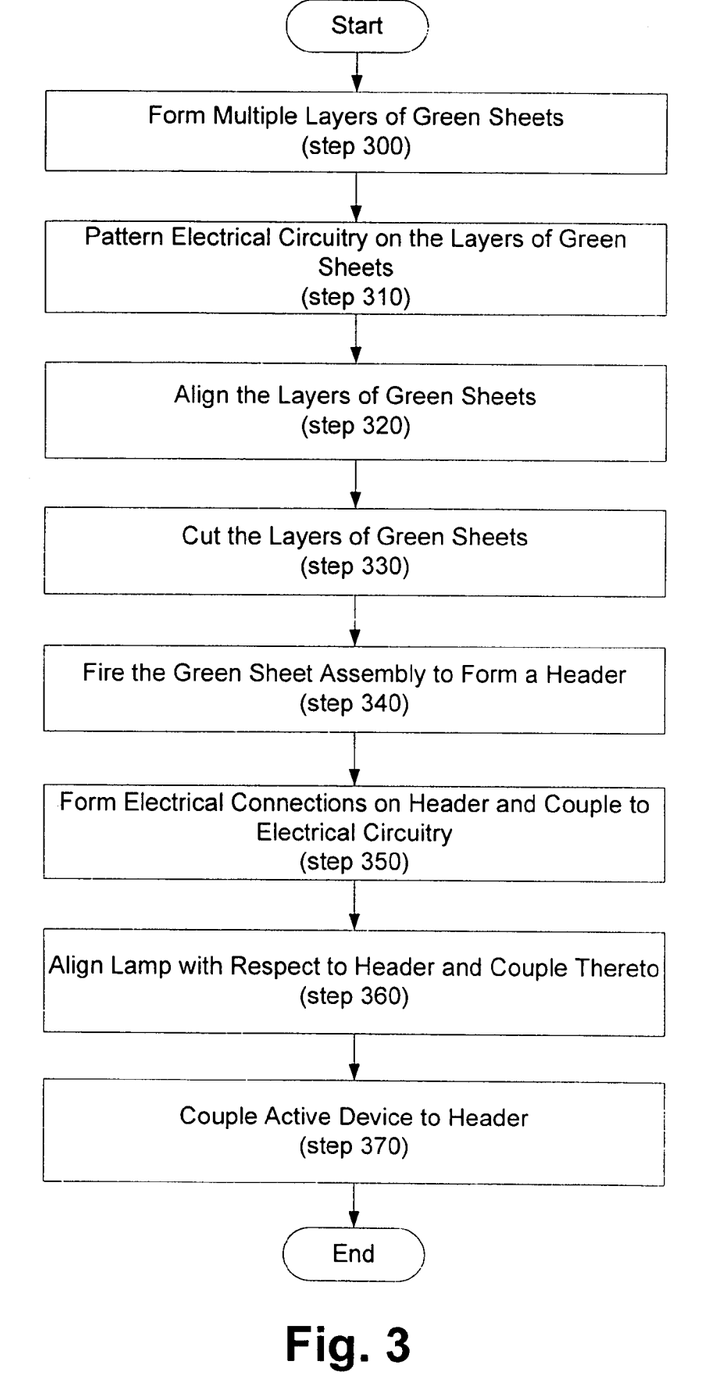
FIG. 3 is a flowchart illustrating a method of forming an improved lamp assembly according to one exemplary embodiment.

FIG. 3 is a flowchart illustrating a method of forming an improved lamp assembly with a multi-layered ceramic (MLC) part. The process begins by forming multiple layers of green sheets (step 300). Green sheets are sheets that comprise a solidified slurry of organic and ceramic materials. The sheets may range in thickness depending on design but usually are from 0.005to 0.05 inches thick. Electrical circuitry is then patterned onto each of the sheets (step 310). By using a MLC design, the requirement of power connection along with heat stability can be attained. A MLC can be thought of as functioning similar to a PC board. By building up the header in layers, traces and vias can be created on each side of the individual layers of green sheets.

The layers of green sheets with electrical circuitry patterned thereon are then aligned (step 320) to insure proper alignment of the electrical circuitry of each of the green sheets. The green sheets are then cut (step 330), and fired (step 340). The firing process removes the organic binder by burning it from the solidified slurry thereby leaving a homogenous ceramic device. As a result of this processing, the green sheets are fused together creating a solid ceramic header that has electrical connections throughout its interior. The layers consist mainly of aluminum oxide and the electrical circuitry consists of tungsten. These layers allow the header to withstand the generated heat load. The direct electrical connection between lamp and the header eliminates the need of feed through holes, which increases the overall efficiency of the reflector. Electrical connections between the lip electrode and the electrical interconnects are established through traces and vias. In processing the green sheets (steps 310-340), a base member is formed that includes two lateral portions and a lamp engaging protrusion is formed on the base.

Electrical connections are then formed on the header and coupled to the electrical circuitry (step 350). The electrical connections include a first and a second source connection formed on each of the lateral portions. The electrical connections also include lamp connections formed on a lip portion of the lamp engaging protrusion and within a cavity formed by the lamp engaging protrusion. The configuration of the base member allows a lamp to be coupled to a projector system such that during operation its fireball is at the focal point of a reflector assembly, regardless of the mounting configuration of the projector assembly of which the improved lamp assembly is a part.

As discussed, correct alignment of the lamp with respect to each part of the system is necessary for optimal operation. Using automated alignment, which may include but is not limited to laser and optical alignment, the lamp is placed within the header and aligned relative to a 'standardized' reflector (step 360). Misalignment of the focal point causes degradation of the image since less light is captured and creates 'hot spots' on the screen instead of a uniform brightness. Ceramic adhesive is used to secure the lamp to the header. In addition, the electrical leads from the lamp may be soldered to the header's electrical connections to enhance the electrical connection between the lamp and the header.

The present method allows for the formation of an improved lamp assembly that may be coupled to a reflector assembly as shown in FIG. 2. The configuration of the improved lamp assembly facilitates the removable coupling of the improved lamp assembly to a reflector assembly without the use of tools. As a result, when the lamp has surpassed its useful life, the improved lamp assembly may alone be replaced without requiring the replacement of the reflector assembly as well. In addition, the electrical interconnects contained within the improved lamp assembly allow the lamp to be electrically coupled to a power source while installed in the reflector assembly without requiring electrical routing to pass through additional holes in the reflector assembly. This configuration improves the effective light output of the lamp. Effective light output is the amount of light produced by the lamp that actually reaches the projection assembly of a projector system.

The electrical circuitry established above (step 310) may include contact pads configured to allow the use of an active device attached to the header. For example, extra solder pads and electrical interconnects could be placed onto an outside layer of the header to allow the placement of a memory device. Accordingly, an active device, such as a memory chip, may be coupled to the header (step 370) and become part of the improved lamp assembly. A projector utilizing an improved lamp assembly having a memory device could have pins that contact to pads that allow access to the memory chip's data. Use of an improved lamp assembly including a memory chip will be discussed in more detail below with reference to FIGS. 5-6.

FIG. 4 is a schematic representation of a projector system (400) that generally includes a light generation assembly (200) and a projection assembly (410) each coupled to a control assembly (420). The light generation assembly (200) is similar to that shown in FIG. 2 and includes a memory chip (190). The control assembly (420) controls the actuation of the lamp assembly (100), thereby controlling the generation of light by the light generation assembly (200). Similarly, the control assembly controls the projection assembly (410), which may be a spatial light modulator (SLM) such as conventionally either a liquid crystal display (LCD) or a digital mirror device (DMD) type projection assembly. Light from the light generation assembly (200) is directed to the projection assembly (410) where it is manipulated to form an image that is then projected onto a viewing surface (not shown). The control assembly (420) is also configured to obtain operating condition information such as the number of hours until lamp failure, the number of starts until lamp failure, the number of temperature cycles with maximum and minimum lamp temperature values, lamp lumen output, lamp current draw versus lamp life, lamp voltage draw versus lamp life, and projector orientation. Other useful information such as the usage rate, purchase location, purchase vendor, and cost can be included in the memory chip (190). The connection between the light generation assembly (200) and the control assembly (420) may include the coupling of the control assembly (420) to the memory chip (190) such that operating condition information may be communicated from the control assembly (420) to the memory chip (190). This information may then be stored by the memory chip (190). In addition, the coupling of the control assembly (420) and the memory chip (190) may facilitate the transmission of information stored on the memory chip to be conveyed to the control assembly (420). The information conveyed to the control assembly (420) may include firmware updates, which update process algorithms residing on the control assembly (420). One method of utilizing information conveyed between the memory chip (190) and the control assembly (420) will be discussed in more detail below.

Figure 5:
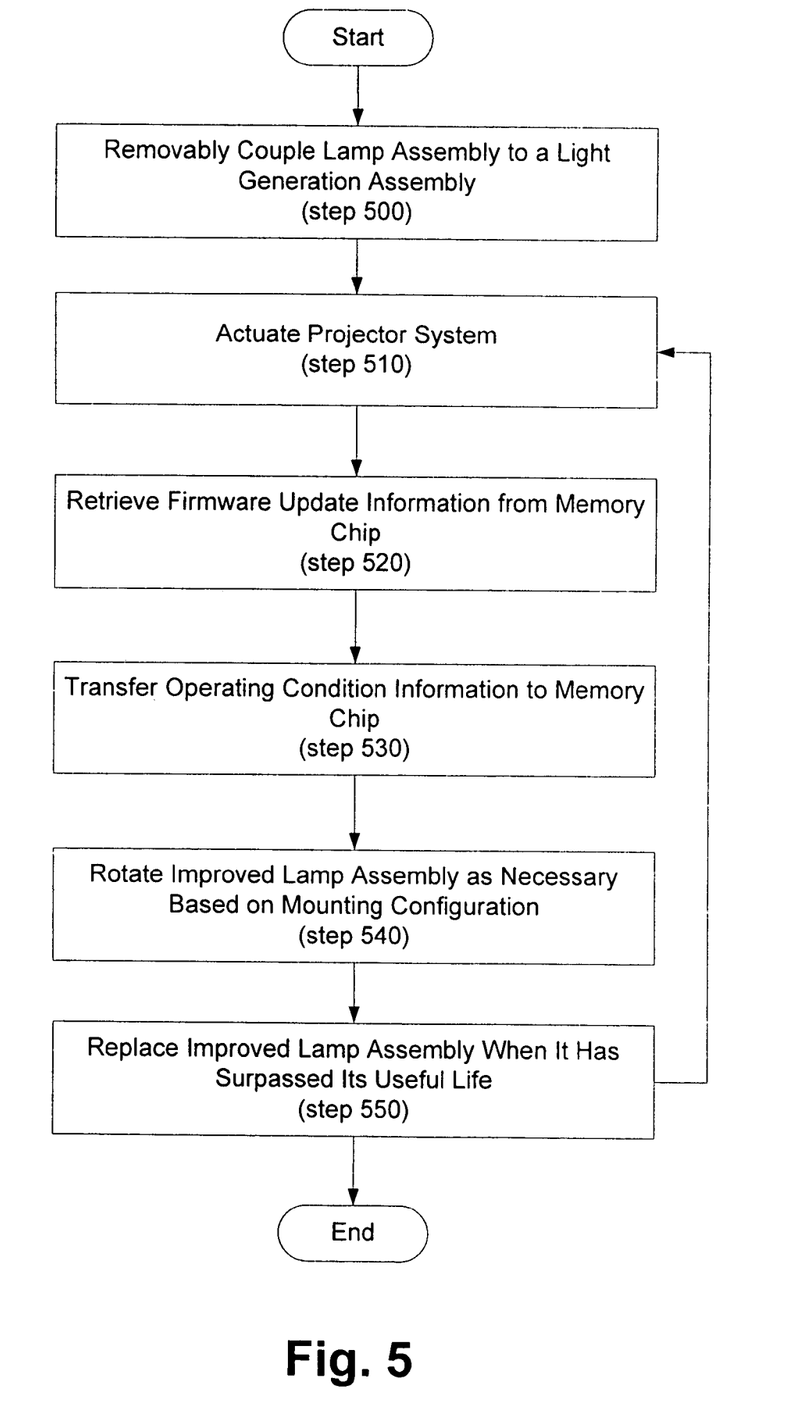
FIG. 5 is a flowchart illustrating a method of using a projector system according to one exemplary embodiment.

FIG. 5 is a flowchart illustrating a method of using a projector system having a lamp assembly with a memory chip. The method begins by removably coupling a lamp assembly to a light generation assembly (step 500) which is part of a projector system. As discussed above with respect to FIG. 2, the manner of coupling the lamp assembly to the light generation assembly will depend on how the projector system is supported.

After the lamp assembly is coupled to the reflector assembly, the projector system is actuated (step 510). This actuation includes the actuation of a light generation assembly and a projection assembly that are controlled by a control assembly. When the system is actuated, a processor in the control assembly retrieves data stored on a memory chip portion of an improved lamp assembly (step 520), which is part of the light generation assembly. This data may include firmware updates, which the processor implements to update the firmware, which operates the control assembly. As a result, the memory chip may be used to update a projector system's firmware without the user's input and/or knowledge. Optionally, the user may be queried to confirm that the firmware update is to proceed.

During the operation of the projector system and throughout the useful life of the lamp, the control assembly collects operating condition information such as the number of hours until lamp failure, the number of starts until lamp failure, the number of temperature cycles with maximum and minimum lamp temperature values, lamp lumen output, lamp current draw versus lamp life, lamp voltage draw versus lamp life, and projector orientation. This operating condition information is transferred to the memory chip (step 530) where it is stored. Storing this data on the memory chip allows for the subsequent analysis of subjective engineering parameters discussed above. This analysis may facilitate the design of more efficient lamps based on actual operating condition data, rather than statistically generated probabilities.

During the useful life of the projector system, it may be necessary to changing the mounting orientation. In such events, the lamp assembly may optionally be rotated 180 degrees with respect to the reflector assembly (step 540) in order to maximize the performance of the projection system based on the mounting configuration of the projector system. The preferred orientation of the lamp assembly may be marked on the header. This marking can be done by stamping, embossing, printing, or other equivalent methods.

Once the lamp has outlived its useful life, the improved lamp assembly may be replaced (step 550). The ability to replace the improved lamp assembly without requiring the simultaneous replacement of the reflector assembly significantly lowers the cost of operating a projector system. Lower operating costs may in turn increase the acceptability of projector systems in consumer environments.

Figure 6:
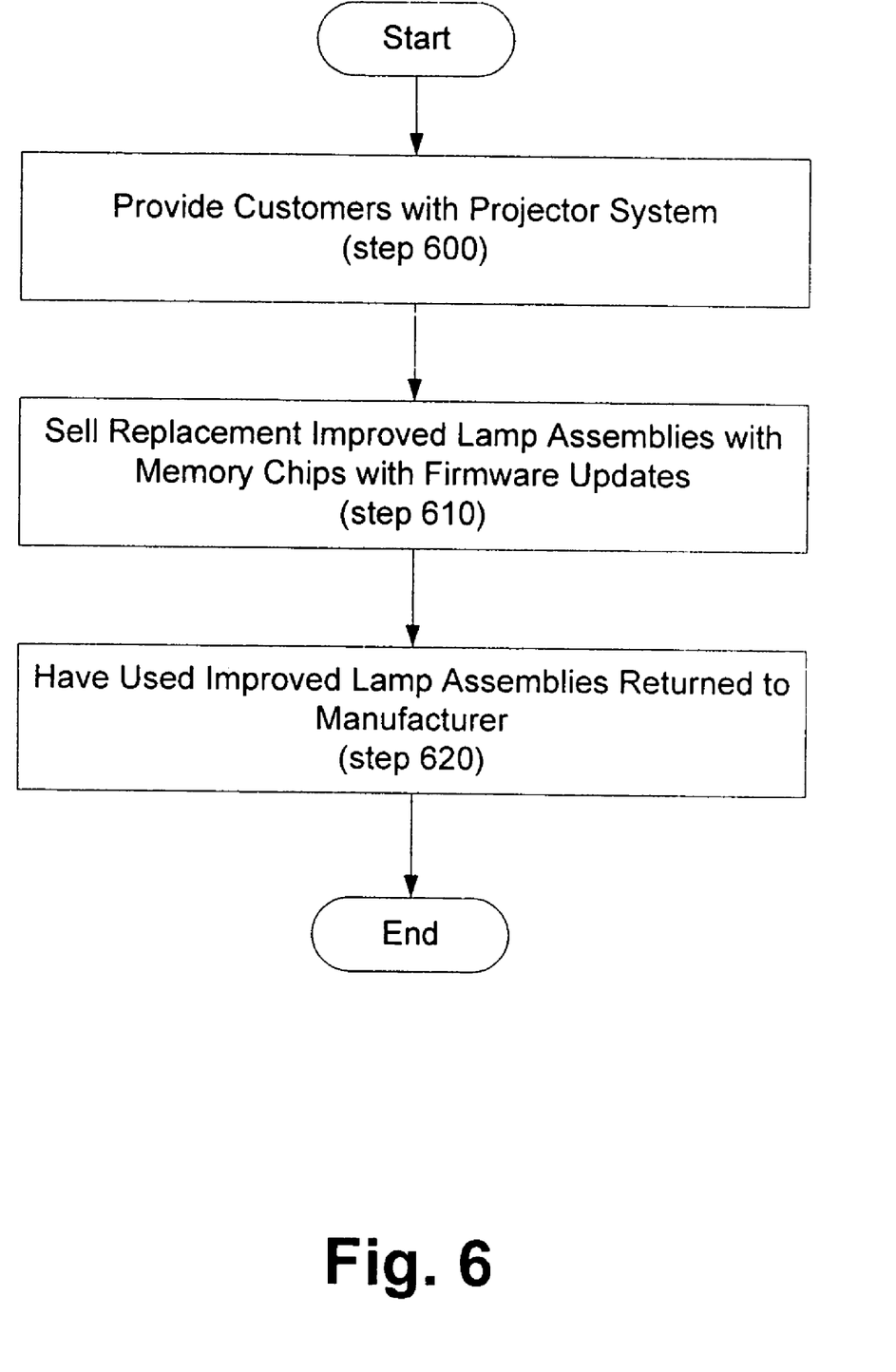
FIG. 6 is a flowchart illustrating a method of doing business according to one exemplary embodiment.

FIG. 6 is a flowchart illustrating a method of updating projector firmware and communicating bulb and projector operational characteristics or conditions. The method begins by providing customers with a projector system (step 600). The projector system includes an improved lamp assembly as part of its original equipment light generation assembly. After a period of use, the lamp eventually surpasses its useful life. The method further includes selling or otherwise providing the customer a replacement improved lamp assembly that includes a memory chip with firmware updates and the capability of storing operational characteristics of the bulb or projector (step 610). Improved lamp assemblies are configured to be replaceable with a minimum of tools, and in most cases may be replaced without the use of any tools. In addition, the projector system is configured to receive the firmware updates to improve the operating parameters of the projector system. The replacement of an improved lamp assembly having a memory chip with firmware updates allows a business to improve or update existing projector systems without or optionally with a consumer's involvement or even knowledge. In addition, operating condition information such as the number of hours until lamp failure, the number of starts until lamp failure, the number of temperature cycles with maximum and minimum lamp temperature values, lamp lumen output, lamp current draw versus lamp life, lamp voltage draw versus lamp life, and projector orientation may be recorded on the memory chip.

This information may be recovered when consumers or others who replace the lamp return the lamp to the manufacturer (step 620). This information may provide market data such as use rate information, purchase point, and product cost.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A light generating assembly for a projector, said light generating assembly comprising:
   a reflector assembly comprising positive and negative electrical contacts disposed on said reflector assembly; and
   a replaceable lamp with a supporting lamp header, said lamp header comprising:
      a base member and an annular lamp engaging protrusion extending from a first surface of said base member;
      at least two positive and two negative source connections disposed on opposing portions of said base member such that said lamp can be positioned within said reflector assembly in either a first orientation or a second orientation, said second orientation being rotated 180 degrees from said first orientation with respect to said reflector assembly, wherein in each orientation one of said positive source connections and one of said negative source connections is electrically coupled, respectively, to said positive contact and said negative contact of said reflector assembly;
      a positive and a negative lamp connection coupled to said annular lamp engaging protrusion; and
      an electrical interconnect coupling each of said positive source connections to said positive lamp connection and coupling each of said negative source connections to said negative lamp connection.

2. The assembly of claim 1, wherein said electrical interconnects are contained within said base member and said annular lamp engaging protrusion.

3. The assembly of claim 1, wherein said header is configured to be removably coupled to a reflector assembly.

4. The assembly of claim 1, wherein said header comprises a ceramic material.

5. The assembly of claim 1, further comprising an indication of a preferred orientation of a lamp assembly with respect to said reflector assembly being marked on said header.

6. The assembly of claim 1, wherein said contacts are fixed in position with respect to said reflector assembly, but make contact with at least some of said positive and negative source connections when said lamp header is installed, irrespective of said lamp orientation, to provide power to said lamp.

7. The assembly of claim 1, wherein said annular lamp engaging protrusion defines a lamp engaging cavity.

8. The assembly of claim 7, wherein said lamp connections are disposed on a lip of said annular lamp engaging protrusion and disposed within said lamp engaging cavity.

9. A replaceable lamp header for positioning a lamp within a reflector assembly, comprising:
   a base member and an annular lamp engaging protrusion extending from a first surface of said base member;
   at least two positive and negative source connections disposed on opposing portions of said base member;
   a positive and a negative lamp connection coupled to said annular lamp engaging protrusion;
   an electrical interconnect coupling each of said positive source connections to said positive lamp connection and coupling each of said negative source connections to said negative lamp connection; and
   an active device coupled to said header.

10. The header of claim 9, wherein said active device is coupled to said base portion of said header.

11. The header of claim 9, further comprising a plurality of memory contact pads disposed on said base member;
   wherein said plurality of memory contact pads are coupled to said active device and are configured to facilitate a rotation of said base member.

12. The header of claim 9, wherein said active device comprises a memory device.

13. The header of claim 12, wherein said memory device contains a firmware update for a control assembly of a projection system.

14. A replaceable lamp header for positioning a lamp within a reflector assembly, comprising:
- a base member and an annular lamp engaging protrusion extending from a first surface of said base member;
- at least two positive and two negative source connections disposed on opposing portions of said base member;
- a positive and a negative lamp connection coupled to said annular lamp engaging protrusion;
- an electrical interconnect coupling each of said positive source connections to said positive lamp connection and coupling each of said negative source connections to said negative lamp connection; and
- two positive and two negative source connections with a positive and negative source connection being disposed on said first surface on both sides of said annular lamp engaging protrusion.

15. The header of claim 14, wherein:
said base member has a rectangular shape;
said two negative source connections are disposed on diagonally opposing portions of said base member; and
said two positive source connections are disposed on diagonally opposing portions of said base member.

16. A light generating assembly for a projector, said light generating assembly comprising:
- a reflector assembly comprising positive and negative electrical contacts disposed on said reflector assembly; and
- a replaceable lamp with a supporting lamp header, said lamp header comprising:
    - a base member and an annular lamp engaging member extending from a first surface of said base member;
    - positive and negative source connections disposed on opposing portions of said first surface of said base member such tat said lamp can be positioned within said reflector assembly in either a first orientation or a second orientation, said second orientation being rotated 180 degrees from said first orientation with respect to said reflector assembly, wherein in either orientation a said positive source connection and a said negative source connection are electrically coupled, respectively, to said positive contact and said negative contact of said reflector assembly, wherein said positive and negative source connections align with said contacts of said reflector assembly when said lamp is in either said first or second orientation so as to allow said lamp header to make electrical connections with said contacts of said reflector assembly in either said first or second orientation;
    - a positive and a negative lamp connection coupled to said annular lamp engaging member; and
    - an electrical interconnect coupling said positive source connection to said positive lamp connection and coupling said negative source connection to said negative lamp connection.

17. The assembly of claim 16, wherein said contacts are fixed in position with respect to said reflector assembly, but make contact with at least some of said positive and negative source connections when said lamp header is installed, irrespective of said lamp orientation, to provide power to said lamp.

* * * * *

UNITED STATES PATENT AND TRADEMARK OFFICE
CERTIFICATE OF CORRECTION

PATENT NO. : 7,387,424 B2
APPLICATION NO. : 10/769613
DATED : June 17, 2008
INVENTOR(S) : John M. Koegler, III et al.

Page 1 of 1

It is certified that error appears in the above-identified patent and that said Letters Patent is hereby corrected as shown below:

In column 1, line 33, after "lamp" insert -- are --.

In column 10, line 1, in Claim 16, delete "tat" and insert -- that --, therefor.

Signed and Sealed this

Fourth Day of November, 2008

JON W. DUDAS
*Director of the United States Patent and Trademark Office*